United States Patent [19]

Maier

[11] Patent Number: 4,674,227

[45] Date of Patent: Jun. 23, 1987

[54] DUAL PURPOSE FLYSWATTER

[76] Inventor: Bruce V. Maier, P.O. Box 5506, Tucson, Ariz. 85703

[21] Appl. No.: 794,537

[22] Filed: Nov. 4, 1985

[51] Int. Cl.⁴ .............................................. A01M 3/02
[52] U.S. Cl. ..................................................... 43/137
[58] Field of Search .......................................... 43/137

[56] References Cited

U.S. PATENT DOCUMENTS

| | | |
|---|---|---|
| 1,882,291 | 10/1932 | Monroe et al. |
| 1,939,838 | 12/1933 | Wasson ............................ 43/137 |
| 2,651,878 | 9/1953 | Webbeking ...................... 43/137 |
| 2,736,129 | 2/1956 | Roop ................................ 43/137 |
| 2,806,320 | 9/1957 | Griffith ........................... 43/137 |
| 2,934,851 | 5/1960 | Grish ............................... 43/137 |
| 2,963,816 | 12/1960 | Miller ............................. 43/137 |
| 4,510,711 | 4/1985 | Bucek ............................. 43/137 |

Primary Examiner—M. Jordan
Attorney, Agent, or Firm—Cahill, Sutton & Thomas

[57] ABSTRACT

A dual purpose flyswatter includes a rigid handle attached to a swatting pad having a tapered, semi-rigid peripheral web support portion and a tapered, perforated web therein. The tapered, semi-rigid peripheral portion is sufficiently rigid to prevent appreciable flexing of the swatting pad when the flyswatter is rapidly deployed to strike a flying insect, yet is sufficiently flexible to bend and conform to a surface on which an insect being swatted rests.

5 Claims, 5 Drawing Figures

DUAL PURPOSE FLYSWATTER

BACKGROUND OF THE INVENTION

The invention relates to improved flyswatters, particularly to flyswatters that can be effectively used to either swat flying insects or insects resting on a surface.

Quite a variety of flyswatting devices are known, as evidenced by U.S. Pat. Nos. 1,882,291; 2,651,878; 2,806,320; and 4,510,711. Most known flyswatters are designed to be effective only when swatting a fly that rests on a surface. To this end, most prior flyswatters include a rigid handle and a relatively flexible swatting pad. Above-mentioned U.S. Pat. No. 2,651,878 discloses a novelty flyswatter which, although similar in shape to prior flyswatters, is deployed in an entirely different manner. It is much smaller in size than a conventional flyswatter, and has a spring leaf handle and a relatively rigid wedge-shaped paddle or swatting pad. The user grips the handle with one hand and uses the finger of the other hand to engage the extreme end of the relatively rigid wedge-shaped paddle and pry it back toward the handle, flexing the spring leaf handle to form an arc of nearly 180°. The thus sprung device is then aimed at an insert on a surface and released, so that the spring handle straightens out, accelerating the wedge-shaped paddle or swatting pad onto the fly or insect. The structure disclosed in U.S. Pat. No. 2,651,878 obviously is impractical for use as an ordinary flyswatter.

Most people have used ordinary flyswatters, and occasionally have been frustrated by the fact that flying insects, especially houseflies and mosquitoes, often refuse to land on a surface on which they can be conveniently swatted. Rigid flyswatters that have the appearance of a miniature tennis racquet have been proposed for swatting flying insects, but these are of limited usefullness, because they cannot be effectively used to swat an insect when it rests on a surface. Frequently, it seems, a pesky fly or mosquito will fly about for a time and then land on a surface of a delicate article on which the insect cannot be safely swatted, or it will land on a ceiling or in a corner where an "ordinary" flyswatter cannot be effectively used. One then must wait for the insect to move, or wave the flyswatter at the fly, hoping that it will move and land on some other more convenient surface. Most people have attempted to swat such a pesky fly or other insect in flight with an ordinary flyswatter, usually without much success. The swatting pads of most flyswatters are flexible, of course, in order to enable them to be used for their ordinary purpose of swatting flies resting on various surfaces, without causing damage to the surface and without unduly crushing the swatted insect, in order to avoid the need to scrub the surface on which the insect was crushed.

Until now, no one has provided a dual purpose flyswatter that is effective when used in the manner of ordinary flyswatters, yet is effective for swatting flies in flight.

SUMMARY OF THE INVENTION

Accordingly, it is an object of the invention to provide a dual purpose flyswatter that can be effectively used to swat insects in flight, and also can be used as an ordinary flyswatter to swat insects resting on surfaces without causing damage to the surface and without unduly crushing the swatted insects.

Briefly described, and in accordance with one embodiment thereof, the invention provides an improved flyswatter having a rigid handle attached to a semi-rigid flyswatting pad that is sufficiently rigid to avoid flexing when the flyswatter is deployed to swat a flying insect. The flyswatting pad is sufficiently flexible to conform to the slope of a rigid surface on which an insect is being swatted without causing damage to the surface and without unduly crushing the insect being swatted. In the described embodiment of the invention, a peripheral portion or ring of the swatting pad is of semi-rigid construction, and is tapered from a thick portion adjacent to the handle to a thin portion at the extreme distal end of the swatting pad. A perforated, more flexible web portion is supported within the semi-rigid peripheral portion of the swatting pad. The semi-rigid pad also can be used to press against a large insect to partly crush it or to injure it under conditions wherein it is not practical to swat the insect.

DESCRIPTION OF THE INVENTION

Figure 1:
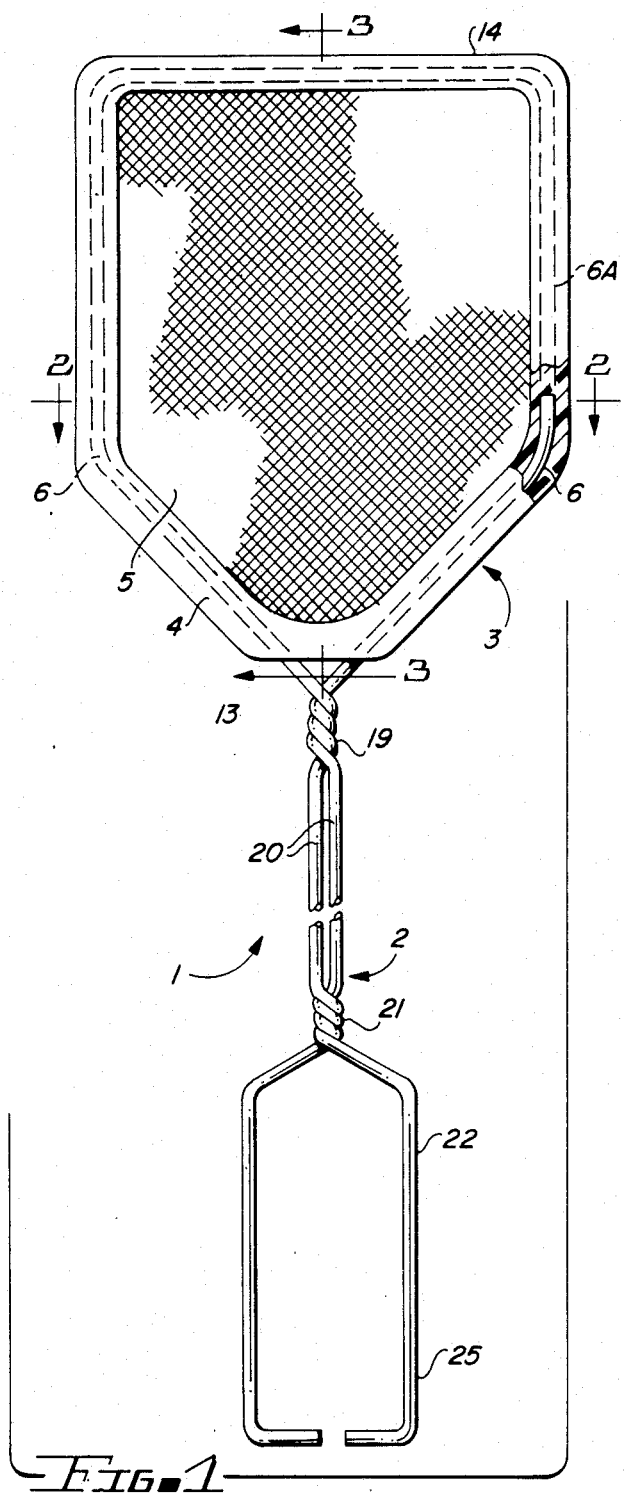
FIG. 1 is a partial plan view of a preferred embodiment of the invention.

Referring now to the drawings, particularly FIG. 1, dual purpose flyswatter 1 includes a generally rigid handle 2 and a swatting pad 3 attached to one end of handle 2. A typical length of handle 2 is about 18 inches. A typical dimensions for swatting pad 3 are approximately four inches by five inches.

Swatting pad 3 includes a semi-rigid peripheral portion 4 or ring that surrounds and supports a relatively flexible web 5. As seen in the cross-section of FIG. 2, a large number of perforations or holes 11 are provided in web 5, to both reduce the air resistance to the swatting pad when the flyswatter is rapidly waved through the air and to accomplish the function of killing the swatted insect without unduly crushing it. The perforations 11 are densely located in web 5, and are sufficiently small (typically less than about one-eighth of an inch in diameter) to prevent insets being swatting from escaping through the perforations 11. Preferably, the thickness of web portion 5 tapers from a maximum thickness of about three-sixteenths of an inch indicated by arrows 8 near the periphery thereof to a minimum thickness of about one-sixteenth of an inch indicated by arrows 7 near the middle, as shown in FIG. 2.

Figure 2:
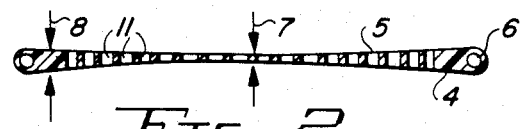
FIG. 2 is a section view of the swatting pad of FIG. 2 along section line 2—2 of FIG. 1.
Figure 3:
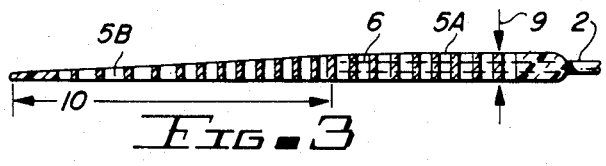
FIG. 3 is a section view of an alternate swatting pad that would be taken along a section line such as 3—3 of FIG. 1.

It is not essential, however, that the center portions of web 5 be tapered in the fashion shown in FIG. 2 An alternate cross-sectional configuration, shown in FIG. 3, provides that the web 5 is gradually tapered to a minimum thickness at its outermost end.

Preferably, the swatting pad 4 and web portion 5 are composed of suitable plastic material. Two relatively rigid wire members 6, which are extensions of handle 2, are embedded in the semi-rigid peripheral portion 4 of swatting pad 3. Preferably, the wire members 6 extend only roughly one-third of the distance from proximal edge 13 of swatting pad 3 to distal or remote edge 14 thereof. Alternatively, however, wire members 6 could extend entirely around the semi-rigid peripheral portion 4 of the flyswatter, as indicated by dotted lines 6A. In this event, the wire member 6 would have to be of decreasing thickness and rigidity, with the most flexible portions being closest to distal edge 14 of swatting pad 3 and the most rigid portions being closest to proximal edge 13 of swatting pad 3.

Handle 2 includes two rigid wire members 20, which are wound tightly at points 19 and 21. Wire members 6 are integral extensions of wire members 20.

Wire members 21 then extend downward from tightly wound portion 21 to form a looped handle 22.

Figure 4:
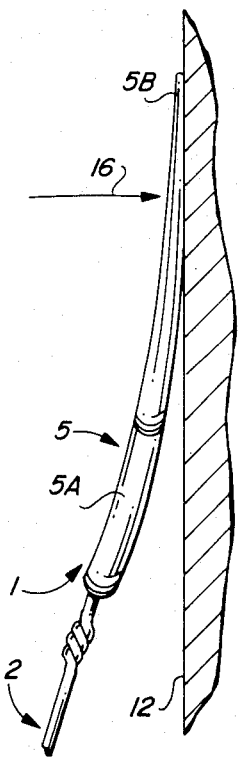
FIG. 4 is a partial side view useful in explaining operation of the flyswatter of FIG. 1 in swatting an insect on a rigid surface.

The method of using the flyswatter 1 as a conventional flyswatter is illustrated in FIG. 4. The handle 2 has been deployed to cause the flyswatting pad 5 to rapidly move through the air in the direction of arrow 16 toward a fly resting on a flat surface 12. The distal or remote two-thirds portion of swatting pad 5, designated by reference numeral 5B, is sufficiently flexible that it bends and conforms to the flat surface 12 during a normal swatting motion.

Figure 5:
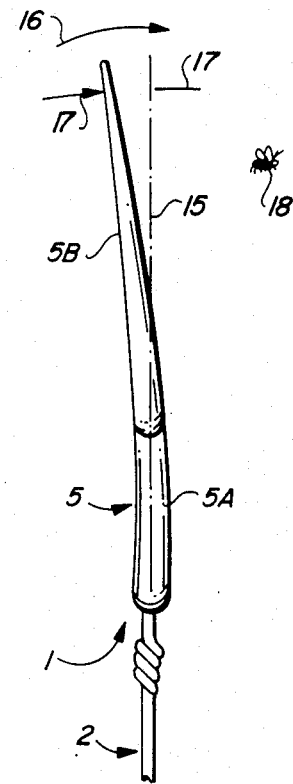
FIG. 5 is a side view useful in explaining use of the flyswatter of FIG. 1 in swatting a flying insect.

A novel use of the flyswatter 1, in accordance with the present invention, is illustrated in FIG. 5, wherein a fly 18 is in flight. The user can rapidly swing handle 2 at insect 18, causing the swatting pad 5 to rapidly move through the arcuate path indicated by reference numeral 16. Despite the fact that the outer section 5B of swatting pad 5 is sufficiently flexible to conform to the surface 12 of FIG. 4 without damaging it, swatting pad 5 nevertheless is sufficiently rigid that it deviates only slightly, as indicated by arrows 17 in FIG. 5, from the axis 15 of the handle 2 as the swatting pad 5 is being accelerated toward the flying insect 18. The outer portions of the swatting pads of prior art flyswatters would bend backwards far more than the amount indicated by arrows 17, greatly reducing the effective area of the swatting pad 5 when attempts are being made to swat an insect in flight, and thereby greatly reducing the likelihood of hitting the flying insect 18 and stunning it or killing it.

Such flexing of the outer portion 5B of the swatting pad does not occur in the flyswatter of FIG. 1 because of the tapered, semi-rigid structure of the peripheral web-supporting portion 4 of swatting pad 5.

Another mode of using the flyswatter of the present invention is to use the semi-rigid swatting pad 3 to poke a large insect, for example, a large spider that has located itself in a corner of a ceiling, forcing it to move out of the corner where it then can be more conveniently swatted or gently crushed by pressing an area of the distal end of the swatting pad 3 against the large insect. This could not be done with a conventional flyswatter because insufficient force could be applied to the insect through the flexible swatting pad to slightly crush the insect.

The above-described flyswatter thus can be used effectively to swat flying insects and to crush insects in hard-to-reach corners and the like, yet is convenient to use in the manner of an ordinary flyswatter, is no more expensive to manufacture than ordinary flyswatters, and avoids the common frustration, experienced by most people, of being unable to hit an insect in flight with prior art flyswatters.

While the invention has been described with reference to a particular embodiment thereof, those skilled in the art will be able to make various modifications to the described embodiment without departing from the true spirit and scope of the invention. For example, it is not necessary that the outer portions of the swatting pad be tapered, as long as they are sufficiently rigid to avoid appreciable flexing during the swatting of an insect in flight, yet are flexible enough to conform to the shape of a rigid surface on which a swatted insect rests.

Also, it is not necessary that the swatting pad be perforated, as described above, as long as its outer portions are sufficiently rigid to avoid appreciable flexing during swatting of an insect in flight, yet are flexible enough to conform to the shape of a rigid surface on which a swatted insect rests. The semi-rigid structure of the peripheral portions of the swatting pad need not have wire extensions of the handle, as disclosed in FIG. 1, if the sides of the swatting pad have sufficiently increased thickness to provide the semi-rigid structure needed to accomplish the foregoing function.

I claim:

1. A dual purpose flyswatter which can swat insects that are in flight or are resting on a surface, the flyswatter comprising in combination:
    (a) a rigid handle having a proximal end and a distal end; and
    (b) a swatting pad rigidly attached to the distal end of the handle, the swatting pad including a relatively rigid proximal portion attached to the distal end of the handle and a distal portion that is sufficiently stiff to prevent appreciable flexing of the swatting pad while the flyswatter is being used to swat at a flying insect, the distal portion of the swatting pad also being sufficiently flexible that it conforms to a rigid surface during swatting of an insect resting on the rigid surface without damage to the surface or undue crushing of the insect, wherein the web of the swatting pad is uniformly perforated with holes that are sufficiently large and closely spaced to effectively reduce air resistance to movement of the swatting pad during swatting of a flying insect, and wherein the sizes of the holes are approximately one-eighth of an inch in diameter, to thereby prevent escape of insects of a predetermined size therethrough;
   wherein a thickened peripheral portion of the swatting pad tapers gradually from a relatively large thickness adjacent to the handle to a relatively small thickness at the distal end of the swatting pad, and the peripheral portion of the swatting pad is relatively stiff and supports a relatively flexible web within the peripheral portion of the swatting pad.

2. The dual purpose flyswatter of claim 1 wherein the thickness of the web of the swatting pad tapers to a minimum thickness at a central portion of the web.

3. The dual purpose flyswatter of claim 1 wherein the swatting pad is composed of plastic.

4. The dual purpose flyswatter of claim 3 wherein the handle is composed of first and second stiff wire members, distal ends of each wire member extending a predetermined distance into the stiff peripheral portion of the swatting pad to provide reinforcement therefor.

5. A dual purpose flyswatter which can swat insects that are in flight or are resting on a surface, the flyswatter comprising in combination:
    (a) a rigid handle having a proximal end and a distal end;

(b) a swatting pad rigidly attached to the distal end of the handle, the swatting pad including a relatively rigid proximal portion attached to the distal end of the handle and a distal portion that is sufficiently stiff to prevent appreciable flexing of the swatting pad while the flyswatter is being used to swat at a flying insect, the distal portion of the swatting pad also being sufficiently flexible that it conforms to a rigid surface during swatting of an insect resting on the rigid surface without damage to the surface or undue crushing of the insect;

(c) a relatively stiff peripheral portion of the swatting pad; and (d) a relatively flexible web supported within the peripheral portion of the swatting pad, wherein the web of the swatting pad is uniformly perforated with holes that are sufficiently large and closely spasced to effectively reduce air resistance to movement of the swatting pad during swatting of a flying insect, and wherein the sizes of the holes are approximately one-eighth of an inch in diameter, to thereby prevent escape of insects of a predetermined size therethrough.

* * * * *